United States Patent
Thompson et al.

(10) Patent No.: US 12,092,554 B2
(45) Date of Patent: Sep. 17, 2024

(54) SHOCK TESTING APPARATUS AND METHOD

(71) Applicant: THORNTON TOMASETTI DEFENCE LIMITED, Fife (GB)

(72) Inventors: Phillip R Thompson, Fife (GB); Gavin Colliar, Fife (GB); Alexander Whatley, Fife (GB); Stuart Hutchison, Fife (GB)

(73) Assignee: THORNTON TOMASETTI DEFENCE LIMITED, Fife (GB)

( * ) Notice: Subject to any disclaimer, the term of this patent is extended or adjusted under 35 U.S.C. 154(b) by 297 days.

(21) Appl. No.: 16/646,872

(22) PCT Filed: Sep. 14, 2018

(86) PCT No.: PCT/GB2018/052637
§ 371 (c)(1),
(2) Date: Mar. 12, 2020

(87) PCT Pub. No.: WO2019/053462
PCT Pub. Date: Mar. 21, 2019

(65) Prior Publication Data
US 2020/0278270 A1    Sep. 3, 2020

(30) Foreign Application Priority Data
Sep. 15, 2017  (GB) .................................... 1714887

(51) Int. Cl.
*G01M 7/08*    (2006.01)
(52) U.S. Cl.
CPC .................... *G01M 7/08* (2013.01)

(58) Field of Classification Search
CPC ..................................................... G01M 7/08
See application file for complete search history.

(56) References Cited

U.S. PATENT DOCUMENTS

| | | | | |
|---|---|---|---|---|
| 4,739,859 A | * | 4/1988 | Delano .................. | G01V 1/047 181/119 |
| 4,750,515 A | * | 6/1988 | Fukushima ............. | F16K 31/22 137/448 |
| 5,003,811 A | | 4/1991 | Shannon et al. | |

(Continued)

FOREIGN PATENT DOCUMENTS

| CN | 103868669 A | | 6/2014 |
|---|---|---|---|
| CN | 103868669 B | * | 7/2015 |
| GB | 2355076 A | | 4/2001 |

OTHER PUBLICATIONS

US Navy, Shock tests. H.I. (High-Impact) Shipboard Machnery, Equipment, and Systems, Requirements For, 1989, USA Information Systems, Inc., MIL-S-901D, pp. 10-16. (Year: 1989).*

(Continued)

*Primary Examiner* — Lina Cordero
*Assistant Examiner* — Lyudmila Zaykova-Feldman
(74) *Attorney, Agent, or Firm* — ArentFox Schiff LLP

(57) ABSTRACT

A shock testing apparatus comprising:
  an impact table for supporting an object to be tested;
  a tank;
  at least one float;
  one or more airguns;
  wherein the at least one float is arranged to float upon a fluid held within the tank and is movable within the tank to impact the impact table in response to the firing of the one or more airguns.

11 Claims, 9 Drawing Sheets

(56) References Cited

U.S. PATENT DOCUMENTS

| | | | |
|---|---|---|---|
| 5,355,716 A | 10/1994 | Castelli | |
| 6,738,315 B1* | 5/2004 | Gray | G01M 7/08 367/145 |
| 6,990,845 B2 | 1/2006 | Voon et al. | |
| 7,051,588 B1* | 5/2006 | Maltby | G01M 7/08 73/161 |
| 8,375,782 B1* | 2/2013 | Robinson | G01M 10/00 73/170.01 |
| 2004/0221553 A1* | 11/2004 | Rapp | B65B 23/00 53/472 |
| 2013/0301393 A1* | 11/2013 | Nance | G01V 1/137 375/295 |
| 2015/0377852 A1* | 12/2015 | Hartland | B63B 21/66 73/170.33 |
| 2016/0118186 A1* | 4/2016 | Frimpong | G01H 1/10 307/119 |
| 2016/0258837 A1* | 9/2016 | Rastegar | G01N 3/31 |
| 2017/0138817 A1* | 5/2017 | Becker | G01M 10/00 |

OTHER PUBLICATIONS

T.V.Flynn, 1994, Experimental Investigation into the Dynamic Response of Two DOF Tuned Deck Simulator for Shock Qualification of Shipboard Systems, Naval Postgraduate School Monterey, California (Year: 1994).*

Dong, CN103868669B, 2015, Downloaded from Espacenet on Apr. 23, 2022 (Year: 2015).*

De Graaf et al., 2014, The pressure field generated by a seismic airgun, Experimental Thermal and Fluid Science, 55, 239-249 (Year: 2014).*

Flynn T. V., 1994, Experimental Investigation into the Dynamic Response of Two DOF Tuned Deck Simulator for Shock Qualification of Shipboard Systems, Naval Postgraduate School Monterey, California. (Year: 1994).*

Reid, W., et al. "Underwater shock testing with seismic air guns." 8th International Conference on Shock & Impact Loads on Structures. 2009. (Year: 2009).*

GB Search Report issued for GB1815009.4, date of search Feb. 15, 2019 (3 pages).

International Search Report issued for PCT/GB2018/052637, date of mailing Jan. 4, 2019 (4 pages).

Written Opinion of the International Searching Authority issued for PCT/GB2018/052637, date of mailing Jan. 4, 2019 (7 pages).

K.L. de Graaf, et al.; "The pressure field generated by a seismic airgun"; Experimental Thermal and Fluid Science, 55, May 1, 2014, pp. 239-249 (11 pages).

M. Brenner et al.; "Navy Ship Underwater Shock Prediction and Testing Capability Study"; Oct. 1, 2007, Retrieved from the internet: URL:https://fas.org/irp/agency/dod/jason/shock.pdf [retrieved on Dec. 19, 2018] (105 pages).

Notification Concerning Transmittal of International Preliminary Report on Patentability issued for PCT/GB2018/052637, date of mailing Mar. 26, 2020 (9 pages).

\* cited by examiner

SHOCK TESTING APPARATUS AND METHOD

CROSS-REFERENCE TO RELATED APPLICATIONS

This application is the U.S. National Stage Application of International Patent Application No. PCT/GB2018/052637, filed on Sep. 14, 2018, which claims priority to GB Application No. 1714887.5, filed on Sep. 15, 2017, the contents of each of which is incorporated herein by reference in its entirety.

FIELD OF THE INVENTION

The present invention relates generally to a portable method of shock testing equipment using seismic airguns to simulate the effects of shocks, such as but not limited to, underwater explosions (UNDEX), in order to assess and prove the robustness of a tested item to mechanical shock of a variety of forms and severities.

BACKGROUND TO THE INVENTION

Shock testing is used in many different engineering environments to demonstrate the robustness and resilience of equipment or systems to a mechanical shock. The type of mechanical shock input may range from a simple robustness low acceleration criteria for handling and transportation of a single item, to a complex and high severity shock pulse applied to a functioning system, for example a diesel generator or a large computer system.

Warships are designed to be robust against underwater explosions (UNDEX), and to demonstrate that a warship has met the required standard of shock capability, a number of qualification shock tests are normally undertaken.

The range of shock qualification tests undertaken cover individual equipments and systems, up to tests covering the entire vessel. Individual equipments and systems are tested to high shock severities, whilst shock testing of an entire vessel may take place at a more modest severity to act as an overall proof of the warship as a system. Shock testing requirements may also apply to complex ordnance and more simple munitions embarked on a ship to certify that they are robust and safe to transport and operate.

GB 2355076 A discloses the use of seismic airguns to simulate the shock pulse arising from a non-contact underwater explosion (UNDEX) against a ship, submarine or barge. This system has proved its flexibility and capability, and finds use in a number of Navies around the world.

Individual equipments and systems may be tested on impact type machines, but these require a fixed infrastructure, and can only provide a limited approximation to the desired UNDEX shock waveform. A number of different shock environments exist across a warship, where key parameters like peak acceleration, displacement and damping all vary with the distance from the UNDEX, the structure of the warship and the location of the item on board.

Swing hammer type shock testing machines, such as those disclosed in U.S. Pat. No. 6,990,845 B2 and U.S. Pat. No. 5,003,811 A), or machines where rotary motion is converted into a shock input (such as US 20160258837 A1 and U.S. Pat. No. 5,355,716) can provide only a simplistic approximation of an UNDEX event and are typically limited to the range of shock environments that they can replicate.

GB 2355076 A discloses the use of seismic airguns to provide an accurate analog to UNDEX.

It is therefore an object of the present invention to provide an improved shock testing method that utilises the benefit of seismic airguns.

SUMMARY OF THE INVENTION

In an aspect of the present invention there is provided a shock testing apparatus comprising:
  an impact table for supporting an object to be tested;
  a tank;
  at least one float;
  one or more airguns;
  wherein the at least one float is arranged to float upon a fluid held within the tank and is movable within the tank to impact the impact table in response to the firing of the one or more airguns.

Optionally, the tank is a substantially open topped fluid-tight vessel defined by a plurality of upstanding sidewalls which extend substantially perpendicularly from a base of the tank.

Optionally, the one or more airguns is/are located in the tank at a location between the base of the tank and at least one float.

Optionally, the one or more airguns is/are mounted on an airgun support frame or frames located proximate the base of the tank.

Optionally, there are provided four airguns. Optionally, the airguns are arranged in a symmetrical array. Optionally, the airguns are arranged in pairs. Optionally each pair of airguns is located on a dedicated airgun support frame.

Optionally, the spacing of the airgun support frame or frames from the base of the tank is adjustable by means of variable height spacers which raise and lower the support frame. In this way, the spacing of the airgun(s) from the float can be adjusted.

Optionally, the one or more airguns are seismic airguns, the firing of which causes a transient acoustic pulse or wave to propagate into the fluid held within the tank which affects motion of the at least one float in the direction of the impact table, to impart a shock pulse to the impact table and any test item located thereon.

Advantageously, the seismic airguns allow shaping and magnitude of the shock pulse through the use of a different number of guns and/or the firing pressure and/or the firing time.

Optionally, the at least one float is a buoyant, fluid-tight element having a box structure comprising a top, sides, a base, and a float impactor plate formed from steel plate.

Optionally, the float is air filled such that the float impactor plate is an air-backed impactor plate.

Optionally, the impact table comprises a bedplate and an impact table impactor plate disposed towards the underside of the bedplate, wherein the impact table impactor plate is arranged to make contact the impactor plate provided on the float.

Optionally, the impact table impactor plate is provided on a baseplate of a box structure having a plurality of sidewalls which depend from the underside of the bedplate, and wherein the box structure is configured to extend into the open end of the tank.

Optionally, the underside of the impact table bedplate is provided around its perimeter with a plurality of support members, the support members being joined end to end to form a continuous rim that is spaced apart from the box structure which it bounds.

Optionally, the impact table further comprises a plurality of leg members.

Optionally, the impact table comprises four leg members.

Optionally, each leg member extends substantially perpendicularly from a corner of the rim of the bedplate. Optionally, on two opposing sides of the impact table, the free ends of adjacent leg members are joined by a structural member, arranged substantially parallel with the impact table bedplate.

Optionally, the legs of the impact table extend downwardly around and spaced apart from the exterior of the sidewalls of the tank.

Optionally, the tank includes a plurality of float guides and a plurality of impact table guides.

Optionally, within the interior of the tank, each opposing upstanding side wall is provided with one or more mutually opposing channel-section guide members, each channel-section guide member comprising a first guide portion located proximate the open end of the tank, and a second guide portion being spaced apart from the first guide portion by a stop member, wherein the first guide portion houses at least one roller adapted for engagement with a side wall of impact table box structure, and wherein the second guide portion houses at least one roller adapted for engagement with the float.

Conveniently, the first guide portion ensures that movement of the impact table relative to the tank is maintained substantially linear. Thus the first guide portion is an impact table guide.

Conveniently, the second guide portion ensures that movement of the float within the tank is constrained to linear motion. Thus the second guide portion is therefore a float guide.

Optionally, the stop members of the channel-section guide members are configured to prevent the box structure of the impact table from extending further into the tank and to maintain the bedplate of the impact table at a minimum height above the tank's open end.

Optionally, at rest the float dwells within the tank at a position determined by the amount of fluid, i.e. water, present in the tank. Thus the spacing between the respective spaced-apart impactor plates of the float and impact table when the float is at rest is a function of the amount of fluid in the tank and the mass of the float.

Optionally, the shock testing apparatus comprises a means to modify and control the motion of the impact table following impact from the float.

Optionally, the means to modify and control the motion of the impact table following impact from the float comprises a first damping means which acts on the impact table externally of the tank and is operable to retard upward acceleration of the impact table following impact from the float.

Optionally, the first damping means comprises a plurality of suitable variable dampers located between the legs of the impact table and a support surface, for example, but not limited to an extended portion of the tank base.

Optionally, the suitable variable dampers connect between the legs of the impact table and a support surface via a structural member of the impact table.

Optionally, the variable dampers are variable spring dampers with combined stiffness and damping.

Optionally, each variable damper is arranged in vertical alignment with a leg of the impact table.

Optionally, to further control and constrain the motion of the impact table following impact of the float, the shock testing apparatus comprises a second damping means which acts on the impact table externally of tank to arrest the downward motion of the impact table, i.e. to decelerate the impact table, during downward travel following impact.

Optionally, the second damping means comprises a plurality of suitable variable stiffness dampers disposed on opposing sides of the tank, each variable stiffness damper being suspended at one end from a side of the tank via a reaction structure, with the opposing end of each damper arranged to be spaced apart from an adjacent upper edge of the structural member of the impact table when in an unloaded configuration, and to slidably abut the upper edge of the structural member when in a loaded configuration.

Optionally, each variable stiffness damper is an adjustable or variable truck shock absorber.

Optionally, the spacing of the end of a damper from an adjacent structural member of the impact table is adjustable by altering the length of the damper, with the variability of the spacing allowing the response of the impact table to an impact from the float to be further varied.

Optionally, to mitigate displacement of the float and the impact table as a result of air bubble expansion from the airgun(s), the air emanating from the airguns is vented around the sides of the float and towards the open end of the tank.

Optionally, to mitigate fluid overflowing the top of the tank and/or to reduce the energy of fluid disturbed by the airguns, baffles are provided around an upper portion of the tank, and optionally around the box structure of the impact table.

Optionally, the bedplate of the impact table comprises a support member configured to enable testing of test items or equipment in alternative orientations. Thus, an item of equipment to be tested may be placed on the impact table in a horizontal orientation, or may be mounted against the support member provided on the bedplate in a vertical orientation, or vice versa. In this way, a shock impulse may be imparted to a test item when it is in either a horizontal or a vertical orientation.

Optionally, the float impactor plate and/or the impact table impactor plate may be further provided with one or more coverings or pads. Optionally, the coverings or pads may be formed from a resilient material, for example, but not limited to, elastomeric material. Different coverings/pads may comprise various material grades or thicknesses. In this way, the shock pulse, and more specifically the rise-time, imparted to an impact table may also, or alternatively, be shaped by altering the damping response through the provision and/or alteration of the coverings/pads at selected impactor plates.

In an optional arrangement, the shock testing apparatus comprises separate first and second impact tables, arranged for shock testing in vertical and horizontal directions, respectively.

Optionally, the first impact table is movable in a substantially perpendicular (i.e. substantially vertical) direction with respect to the base of the tank, and the second impact table is movable in substantially parallel direction (i.e. substantially horizontal direction) with respect to the base of the tank, wherein the first impact table is associated with a vertically constrained float and the second impact table is associated with a horizontally constrained float.

Optionally, the airgun(s) is/are located below the first impact table. Conveniently, upon firing of the airguns, the energy of the transient acoustic pulse from the airgun(s) is transferred through the fluid within the tank to move the vertically constrained float upwardly to impact the first impact table and move the horizontally constrained float laterally to impact the second impact table. In this way, shock testing in vertical and horizontal directions can be carried out simultaneously.

Optionally, the shock testing apparatus further comprises a base structure for supporting the impact table and the tank, wherein the base structure comprises a plurality of side members, end members and corner stanchions arranged to define a substantially rectangular box-shaped frame.

Optionally, the base structure comprises one or more cross members or bracing plates.

Optionally, at each corner of the base structure there is provided a casting adapted to engage with a twistlock or other connector for secure mounting on a support surface, for example the ground or surface at a test location, a bed of a trailer or the deck of a vessel or platform. Preferably the castings are ISO castings. Optionally, the castings are located at the lower ends of the respective corner stanchions. Optionally, the upper ends of the corner stanchions provided with suitable castings or formations, such as eyelets, to facilitate lifting of the apparatus by a crane or the likes. Thus the base structure is portable.

Optionally, the base structure is nominally 6.06 m in overall length and 2.44 m in overall width. In this way, the base structure has substantially the same footprint as a standard 20 feet (ft) ISO container unit. The ISO footprint and provision of ISO castings adapted to receive standardised connectors enables the shock testing apparatus to be carried on a standard trailer and be secured in place at its place of use to a defined specification.

Optionally, the shock testing apparatus further comprises removable side and end walls and a top covering, the removable side and end walls adapted to upstand from the base structure such that the apparatus is convertible from a containerised transport configuration to a shock testing configuration.

Optionally, airgun firing controls are located within the curtilage of the base structure.

Optionally, the shock testing apparatus further comprises one or more data capture means, such as but not limited to: high-speed cameras; strain gauges; pressure gauges; accelerometers, or other instrumentation having the purpose of monitoring the test article response and providing feedback to the operator on apparatus performance.

Optionally, the tank, impact table(s), the float(s) and the base structure are of steel construction In another aspect of the present invention there is provided a method of shock testing objects comprising the steps of:
  providing a shock testing apparatus in accordance with the first aspect of the invention;
  securing an object or objects to be tested on an impact table of the shock testing apparatus;
  and firing one or more airguns to cause a transient acoustic pulse or wave to propagate into the fluid held within the tank to affect motion of a float in the direction of the impact table such that the float impacts the impact table thereby imparting a shock pulse to the test item or items secured thereon.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention will now be described in detail with reference to the accompanying figures. Still other aspects, features, and advantages of the present invention are readily apparent from the entire description thereof, including the figures, which illustrates a number of exemplary aspects and implementations. The invention is also capable of other and different examples and aspects, and its several details can be modified in various respects, all without departing from the spirit and scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa.

Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

Any references to directional and positional descriptions such as upper and lower and directions e.g. "vertical", and "horizontal" etc. are to be interpreted by a skilled reader in the context of the examples described to refer to the orientation of features shown in the drawings, and are not to be

DETAILED DESCRIPTION

With reference to FIGS. 1 to 3 and 5 to 8 there are shown examples of a shock testing apparatus 1 in accordance with the invention comprising an impact table 20 for supporting an object to be tested, a tank 30, a float 40 (FIGS. 4a, 4b, 7, 8) and a plurality of airguns 50 (FIGS. 4a, 4b, 7, 8).

Figure 4A:
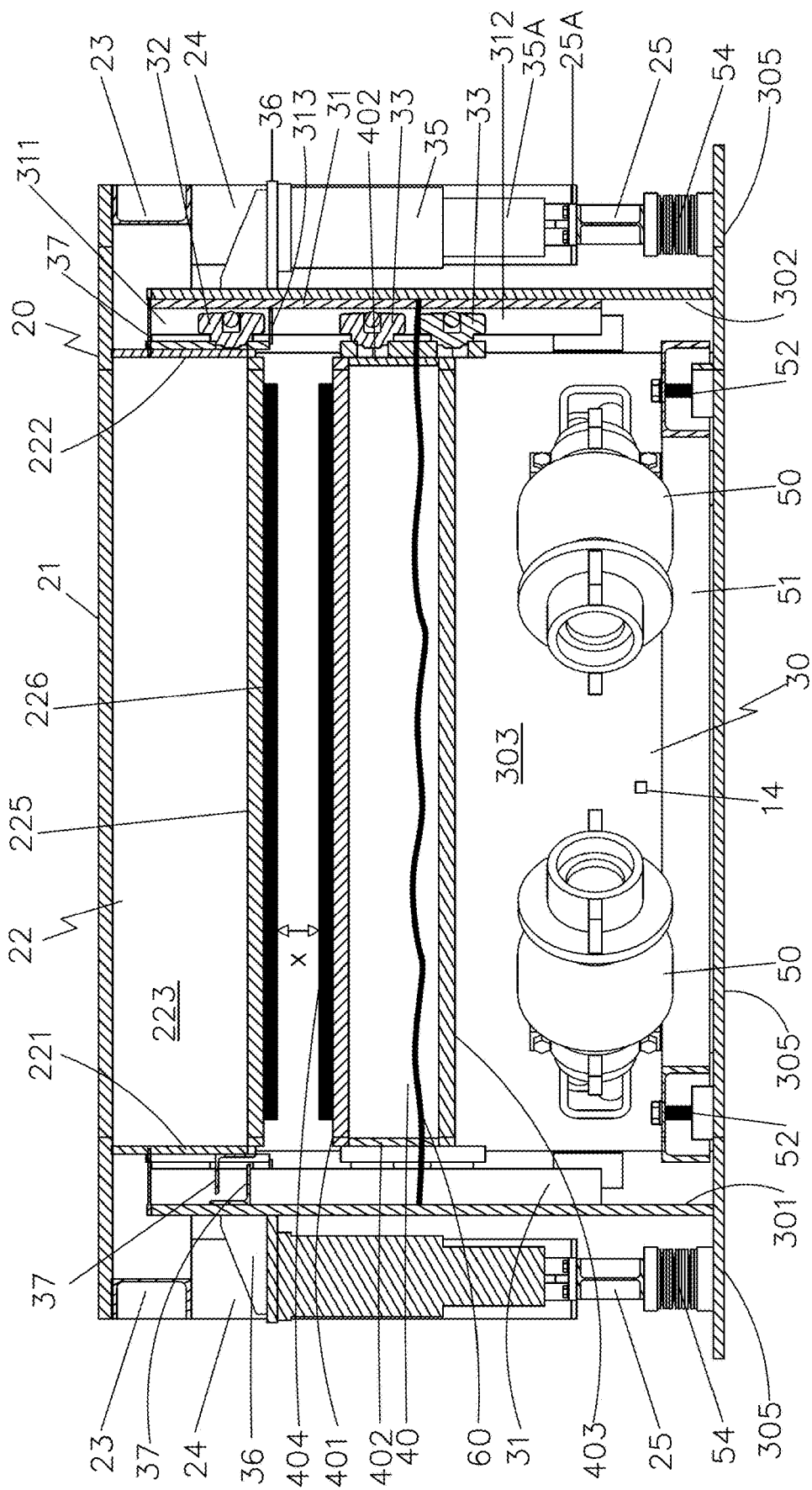
FIGS. 4a and 4b are schematic transverse cross-sections of the shock testing apparatus of FIGS. 1 to 3.

With reference to FIG. 4a, impact table 20 is a stiffened structure comprising a bedplate 21 and a box structure 22 which depends from the underside of the bedplate 21. Box structure 22 is a stiffened structure having a plurality of sidewalls 221, 222, 223, 224 and a baseplate 225. Baseplate 225 is provided with an impactor plate 226 on its underside, i.e. at the bottom of, and external to, the box structure 22. Impactor plate 226 is arranged to contact a corresponding impactor plate 404 provided on a float 40 located within tank 30 as described below. Preferably the impact table is of steel construction. The underside of bedplate 21 is provided around its perimeter with a plurality of support members, joined end to end to form a continuous rim 23 that is spaced apart from box structure 22 which it bounds. The support members which define rim 23 may comprise box, C-section, or other suitable members, and may optionally comprise one or more reinforcing webs along part or all the respective lengths of said support members.

Figure 1:
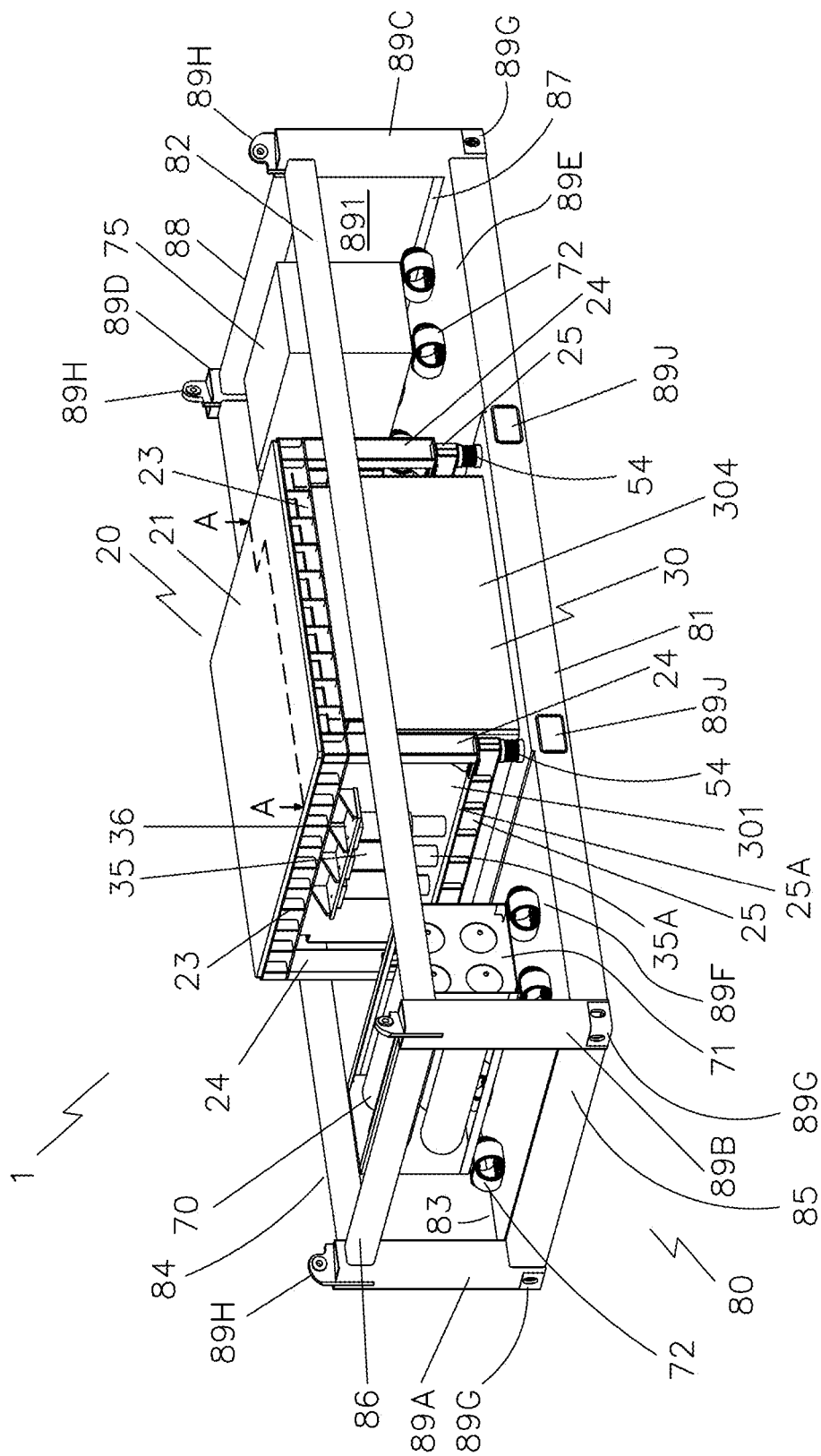
FIG. 1 is a schematic perspective front view of a first configuration of a shock testing apparatus in accordance with the invention, for testing in a vertical direction.

With reference to FIGS. 1 and 4a, impact table 20 further comprises four leg members 24, each leg member depending substantially perpendicularly from a corner of rim 23 of bedplate 21. On two opposing sides of the impact table, the free ends of adjacent leg members 24 are joined by a structural member 25, arranged substantially parallel with the bedplate 21.

Figure 5:
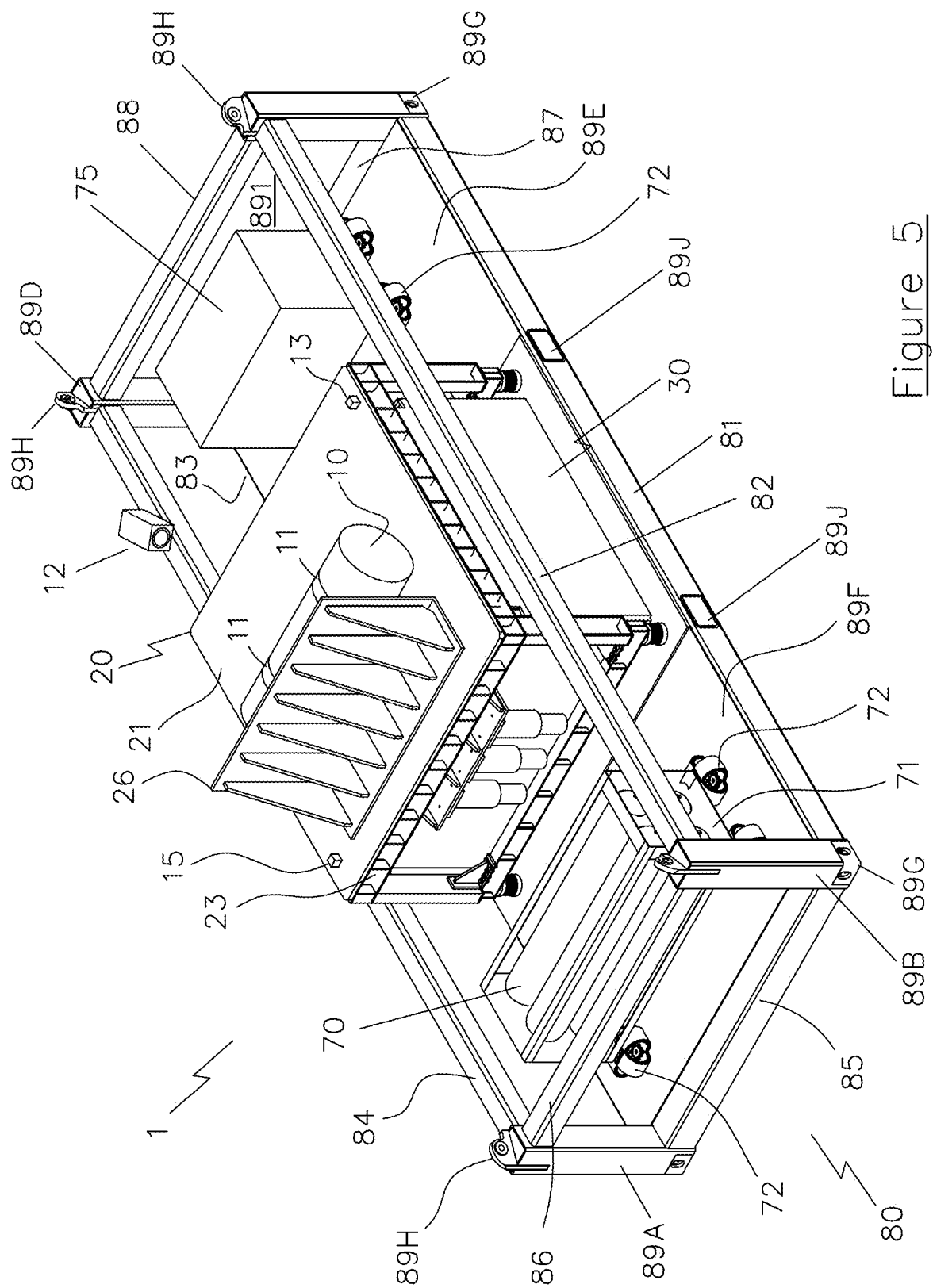
FIG. 5 is a schematic perspective front view of a further configuration of the shock testing apparatus in accordance with the invention, comprising an up-stand member to enable testing of equipment in alternative orientations.

As shown in FIG. 5, an exemplary test object 10 may be attached to the bedplate 21 by any suitable attachment mechanism, for example, but not limited to, retaining straps, bands, clamps or collars 11, designed to replicate the same constraints experienced by, or restraints used on, the test object in its normal service environment.

With reference to FIG. 4a, tank 30 is a substantially open topped fluid-tight vessel having a stiffened structure defined by a plurality of upstanding sidewalls 301, 302, 303 which extend substantially perpendicularly from a base member 305. A fourth side wall 304 is shown in FIG. 1. Optionally, the tank is of steel construction.

Within the tank's interior, its opposing side walls 301, 302, 303, 304 are each provided with one or more mutually opposing and substantially vertically arranged channel-section guide members 31. For clarity, in FIG. 4a channel-section guide members 31 are shown on side walls 301 and 302 only.

Each channel-section guide member 31 comprises a first guide portion 311 located proximate the open end of the tank 30, and a second guide portion 312 being spaced apart from the first guide portion 311 by a stop member 313.

Within the first guide portion 311 there is provided a roller 32 adapted for engagement with a side wall of impact table box structure 22. Within the second guide portion there is provided at least one, or preferably two, rollers 33 adapted for engagement with the float 40 located within the tank 30 as described below.

With reference to FIG. 4a, which is a transverse cross-section of the impact table/tank assembly of FIG. 1 in the plane A-A, impact table 20 is arranged so that when the apparatus 1 is assembled, the box structure 22 extends into the open end of tank 30 with the sidewalls 221, 222, 223, 224 of box structure 22 each being in guided engagement with a roller 32 of the first guide portion 311 of one or more guide member(s) 31 which ensures that motion of the impact table 20 relative to the tank 30 is maintained substantially linear. Thus the first guide portion 311 is an impact table 20 guide. Stop member(s) 313 of channel-section guide member(s) 31 prevent the box structure from extending further into the tank and maintain the bedplate 21 of the impact table 20 at a minimum height above the tank's open end.

When assembled in this way, the legs 24 of the impact table extend downwardly around and spaced apart from the exterior of the sidewalls 301, 302, 303, 304 of tank 30.

Float 40 is located within tank 30. Float 40 is a buoyant, stiffened, fluid-tight element of steel construction that is arranged to float upon a fluid, e.g. water 60, contained within the tank 30. Optionally, float 40 is a box structure comprising a top 401, sides 402 and a base 403. The top 401 of the float, i.e. that surface facing the impactor plate 226 of the impact table 20, is provided with a float impactor plate 404, preferably made from plate steel. To ensure water-air discontinuity, float 40 is air filled, and thus the impactor plate 404 is an air-backed steel plate.

Movement of the float 40 within the tank is constrained to linear motion by means of the one or more rollers 33 located in the second guide portion 312 of one or more guide member(s) 31. Thus the second guide portion 312 is therefore a float guide.

The dwell position of the float 40 within tank 30 is determined by the amount of fluid, i.e. water 60, present in the tank 30. Accordingly, the size of the gap X between the respective impactor plates 404, 226 of the float and impact table 20 in the dwell position is a function of the amount of fluid in the tank and the mass of the float 40.

At a location between the float 40 and the base 305 of the tank 30 there is provided at least one airgun 50 mounted on an airgun support frame 51 which is located proximate the base 305 of tank 30. Optionally, there are provided four airguns. Optionally, the airguns are arranged in a symmetrical array. Optionally the airguns are arranged in pairs. Optionally each pair is located on a dedicated airgun support frame. In the example shown in FIGS. 4a and 4b, two airguns 50 mounted to a support frame 51 are visible, however due to the cross-sectional nature of the drawings, two further airguns mounted on a support frame are not visible. It will be appreciated that the total number of airguns employed can vary, depending for example on, but not limited to, the size of the tank, or the size of the airguns. The spacing of the airgun support frame 51 from the base 305 of the tank 30 is adjustable by means of variable height spacers 52 which raise and lower the support frame 51. In this way, the spacing of the airgun(s) from the float 40 can be adjusted.

Airguns 50 are seismic airguns. Seismic airguns are essentially high pressure chambers of compressed air which, by the action of a fast actuating solenoid valve, rapidly release the pressure in the chambers, causing a transient acoustic pulse or wave to propagate into the surrounding water 60.

When fired, the transient acoustic pulse from the airguns meets the base 403 of the float to affect motion of the float 40 in the direction of the impact table 20, whereupon the impactor plate 404 of the float collides with the impactor plate 226 of the impact table 20, imparting a shock pulse to the impact table which is accelerated upwardly. This motion of the float 40 and its subsequent impact with the impact table 20 occurs within a period of milliseconds.

Advantageously, the seismic airguns 50 allow shaping and magnitude of the shock pulse through the use of a different number of guns and/or the firing pressure and/or the firing time, with further modification possible by modification of the way in which the airgun output interacts with the supporting table.

To mitigate secondary displacement of the float 40 and the impact table as a result of air bubble expansion from the airguns, the air emanating from the airguns is vented around the sides of the float 40 and towards the open end of the tank 30.

To mitigate water overflowing the top of the tank 30, and/or to reduce the energy of water disturbed by the airguns 50, baffles 37 are provided around the upper portion of the tank 30 and optionally around the box structure 22 of the impact table.

To modify and control motion of the impact table 20 following impact of the float 40, impact table 20 comprises a first damping means which acts on the impact table externally of the tank 30.

The first damping means is operable to retard the upward acceleration of the impact table following impact, and comprises a plurality of suitable variable dampers 54 which are located between the structural members 25 of the impact table 20 and a support surface, for example, but not limited to, an extended portion of tank base 305 as shown in FIG. 4a, or the surface of optional base structure 80 as shown in FIG. 1. Optionally, the variable dampers 54 are variable spring dampers with a combined stiffness and damping. Optionally, the variable dampers 54 are arranged in vertical alignment with the legs 24, i.e. towards the ends of the members 25.

With reference to FIGS. 1 and 4a, to further control and constrain the motion of the impact table 20 following impact of the float 40, the impact table further comprises a second damping means which acts on the impact table 20 externally of tank 30.

The second damping means is operable to arrest the downward motion of the impact table, i.e. to decelerate the impact table 20 during downward travel, and comprises a plurality of suitable variable stiffness dampers 35 located on opposing sides 301, 303 of tank 30. Each variable stiffness damper 35 is connected at one end to a side of the tank 30 via a reaction structure 36. An example of a suitable damper is an adjustable or variable truck shock absorber. In an unloaded configuration as shown in FIGS. 1 and 4a, the opposing end 35A of each damper 35 is spaced apart from the adjacent upper edge 25A of a structural member 25 of the impact table. In a loaded configuration, the opposing end 35A of each damper 35 is adapted to slidably abut against the upper edge 25A of a structural member 25. The gap between the end of each damper 35A and the adjacent upper edge 25A of a structural member 25 can be adjusted by altering the length of the damper, with the variability of the gap allowing the response of the impact table 20 to be further varied.

The first and second damping means together act to modify and limit the upwards and downwards motion of the impact table 20 in response to the activation of the airguns 50.

With reference to FIGS. 1 and 5, compressed air for the airguns 50 is provided by high-pressure air bottles 70, and/or an air compressor 75 located externally of the tank, for example on a base structure 80 of the shock testing apparatus. Air bottles 70 may be supported on a rack 71 mounted to the base structure 80. With reference to FIGS. 1 and 5, in an optional arrangement, the shock testing apparatus comprises a base structure 80. Base structure 80 is a portable structure comprising side members 81, 82, 83, 84, end members 85, 86, 87, 88 and corner stanchions 89A, 89B, 89C, 89D. Side members 24, 25, 45, 46 are spaced apart and substantially parallel to each other, and the end members 85, 86, 87, 88 are spaced apart and substantially parallel to each other so that together, in conjunction with the corner stanchions 89A, 89B, 89C, 89D, they define a substantially rectangular box-shaped frame. To increase the rigidity of base structure 80, one or more cross members or bracing plates 89E, 89F may be provided. Such cross members or bracing plates 89F, 89F may also support compressor 75 and air bottles 70 mounted to the base structure 80.

Each corner of the base structure 80 is provided with a casting 89G adapted to engage with a twistlock or other connector for secure mounting on a support surface, for example the ground or surface at a test location, a bed of a trailer or the deck of a vessel or platform. Such castings 89G are preferably ISO castings. Optionally, the castings are located at the lower ends of the respective corner stanchions 89A, 89B, 89C, 89D. The upper ends of corner stanchions 89A, 89B, 89C, 89D are optionally provided with suitable castings or formations, such as eyelets 89H, to facilitate lifting of the apparatus by a crane or the likes. In the Figures, base structure 80 is shown as a rectangular frame however it will be appreciated that in alternative embodiments any suitable shape of base structure can be employed. The base structure is of rigid steel construction.

Figure 2:
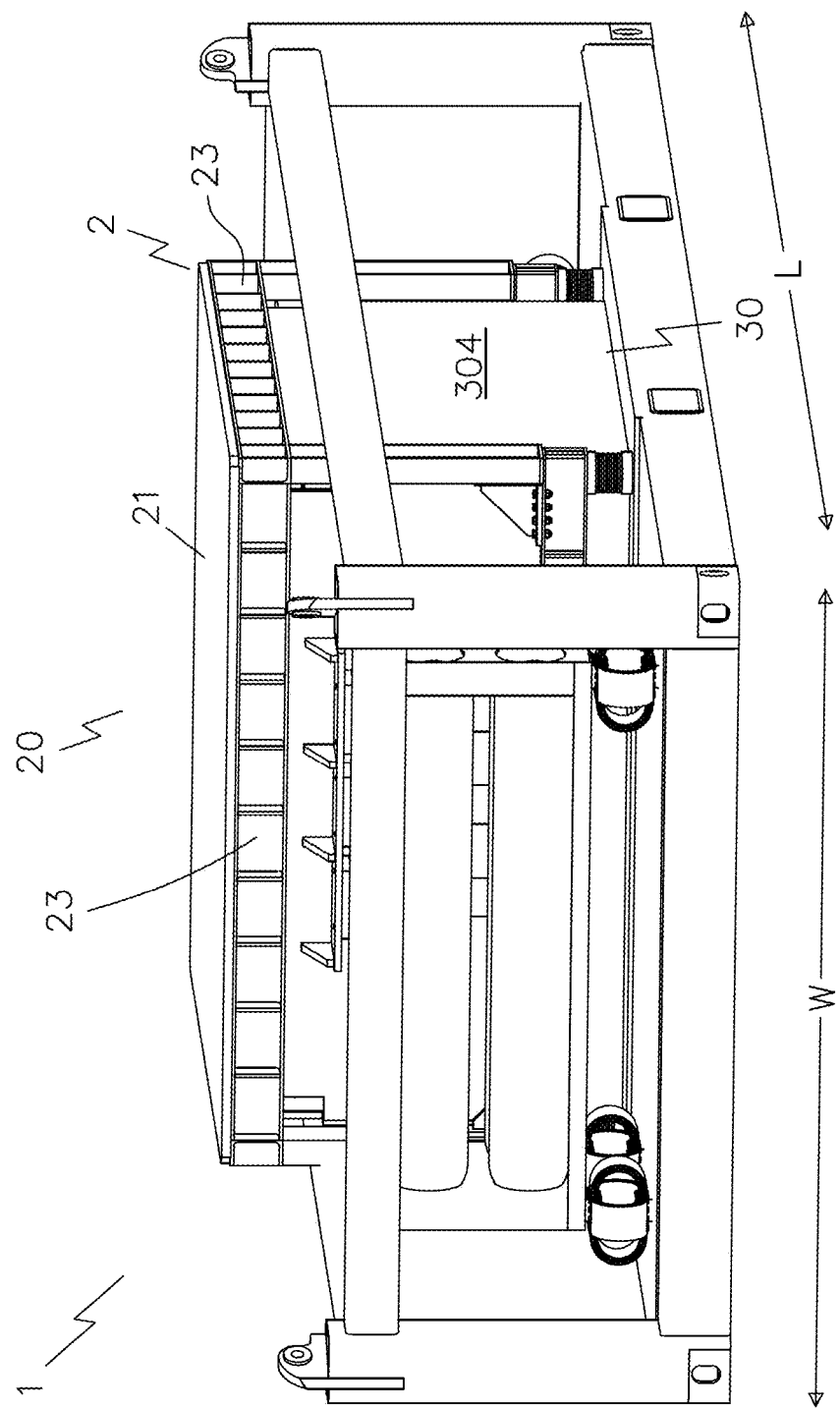
FIG. 2 is a schematic perspective end view of the shock testing apparatus of FIG. 1.

In one example, the base structure is nominally 6.06 m in overall length (L) and 2.44 m in overall width (W) as indicated in FIG. 2. In this way, the base structure has substantially the same footprint as a standard 20 feet (ft) ISO container unit. The ISO footprint and provision of ISO castings adapted to receive standardised connectors enables the shock testing apparatus to be carried on a standard trailer and be secured in place at its place of use to a defined specification.

Figure 3:
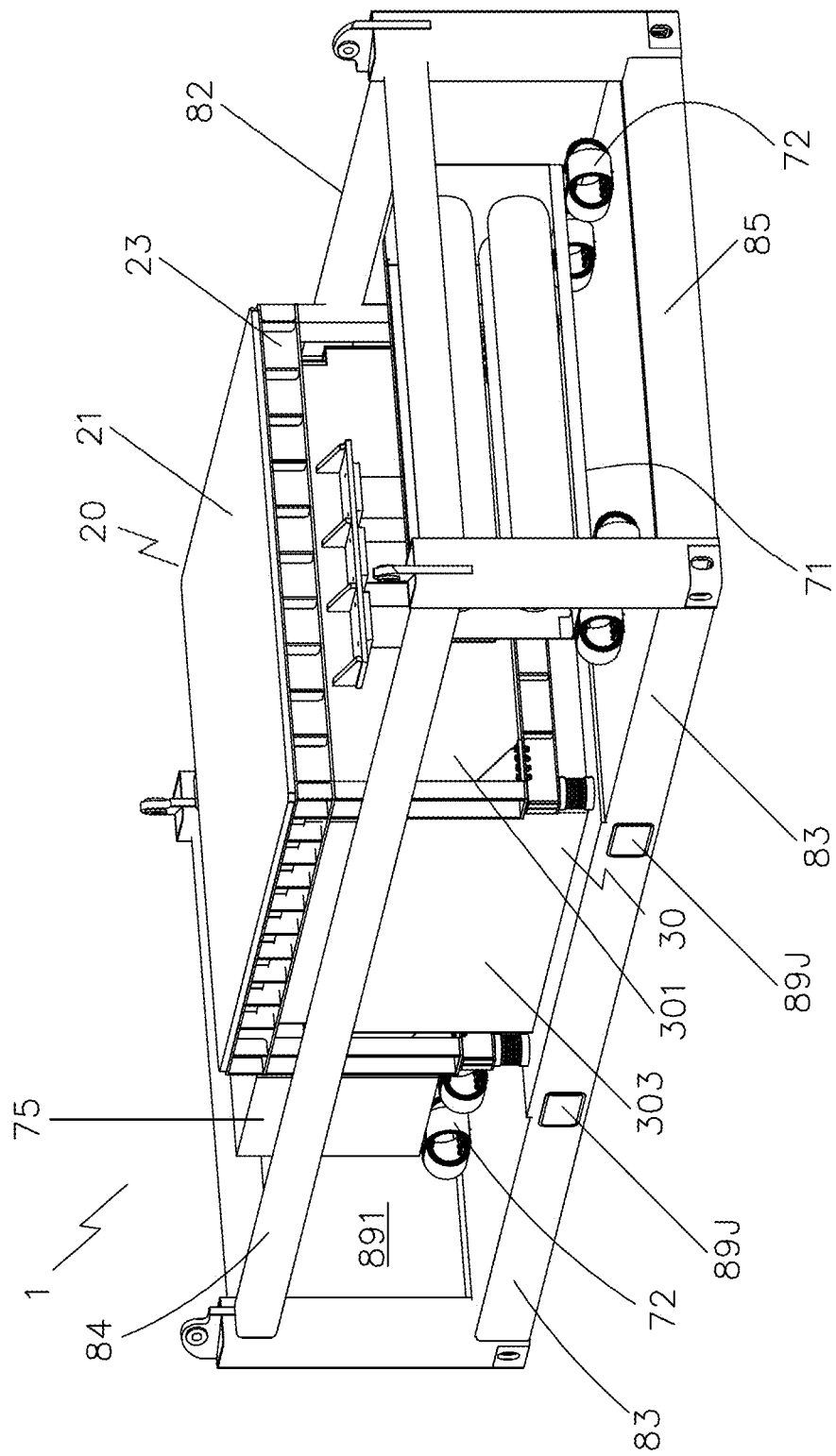
FIG. 3 is a schematic perspective rear view of the shock testing apparatus of FIGS. 1 and 2.

With reference to FIGS. 3 and 5, the shock testing apparatus further comprises removable side and rear wall panels 89I which are upstanding from the base structure, and a top cover or coverings, which together conceal the apparatus within a container format and provide protection from the weather during transportation and storage. In this way, the shock testing apparatus is convertible between a containerised, transport configuration and an assembled equipment testing configuration. For clarity, a portion of a one wall panel 891 is shown in FIGS. 1 and 3 only. Optionally the height of the side and rear walls when assembled extend to a nominal height of 2.6 m above the ground engaging surface of the base structure 80.

The eyelets 89H provided on the corner stanchions 89A, 89B, 89C, 89D enable the shock testing apparatus to be positioned, for example by lifting by a crane, at a maintenance, test or transport location. In addition, a plurality of apertures 89J provided in the base structure through side members 81 and 83 that are sized and spaced to receive the forks or tines of a forked lifting appliance enable the shock testing apparatus to be readily moved.

As shown in FIGS. 1 and 5 high pressure air-bottle rack 71 and air compressor 75 are each mounted onto the base structure via a plurality of shock absorbing mounts 72 which protect against the effects of shock pulses.

With reference to FIG. 5, the bedplate 21 of impact table 20 may optionally comprise a support member 26 to enable testing of test items or equipment in alternative orientations. For example, an object or item of equipment 10 to be tested may be placed on the impact table in a horizontal orientation, or may be mounted against support member 26 provided on bedplate 21 in a vertical orientation, or vice versa. In this way, a shock impulse can be imparted to a test item 10 when it is in either a horizontal or vertical orientation.

Figure 6:
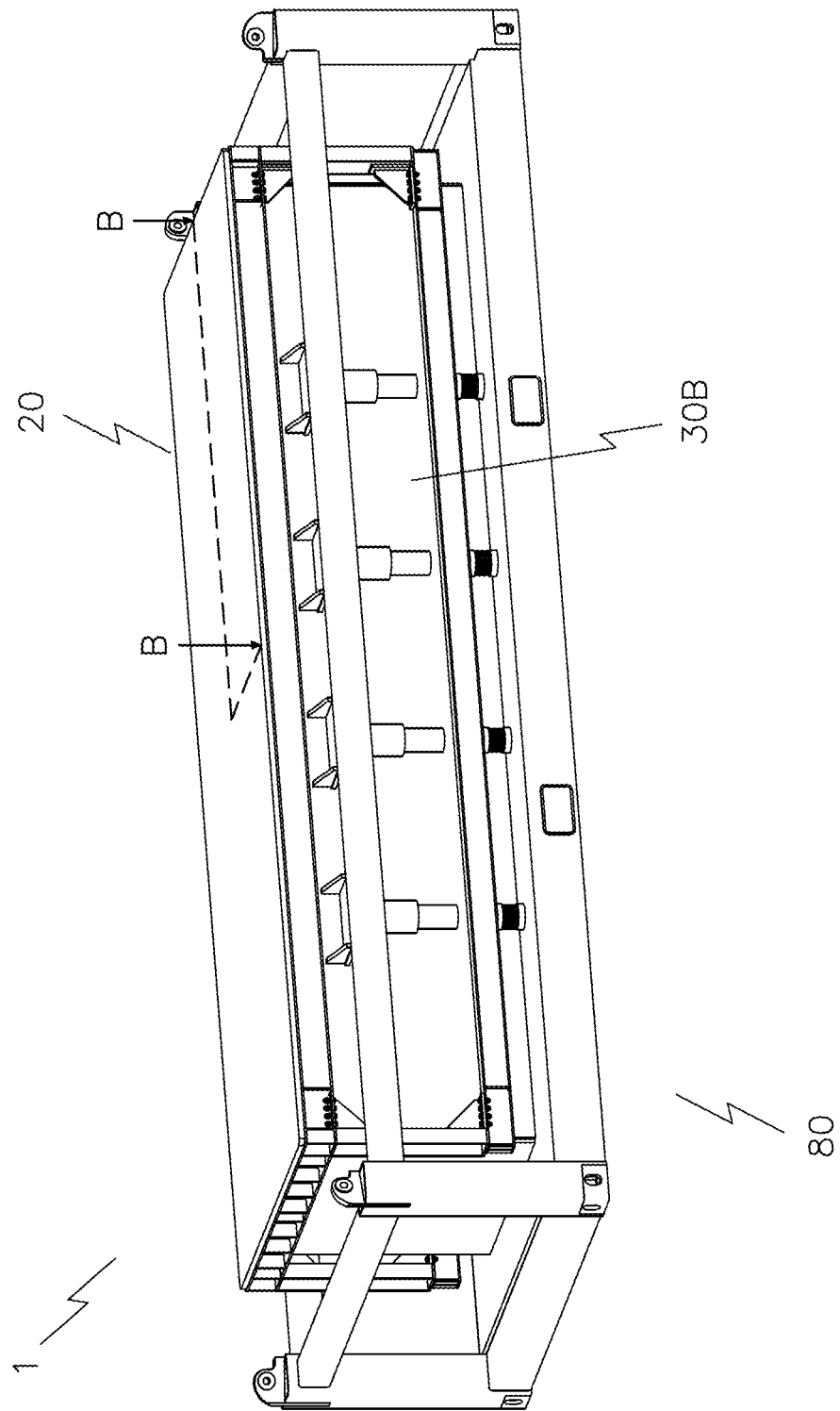
FIG. 6 is a schematic perspective front view of a further configuration of the shock testing apparatus in accordance with the invention.
Figure 7:
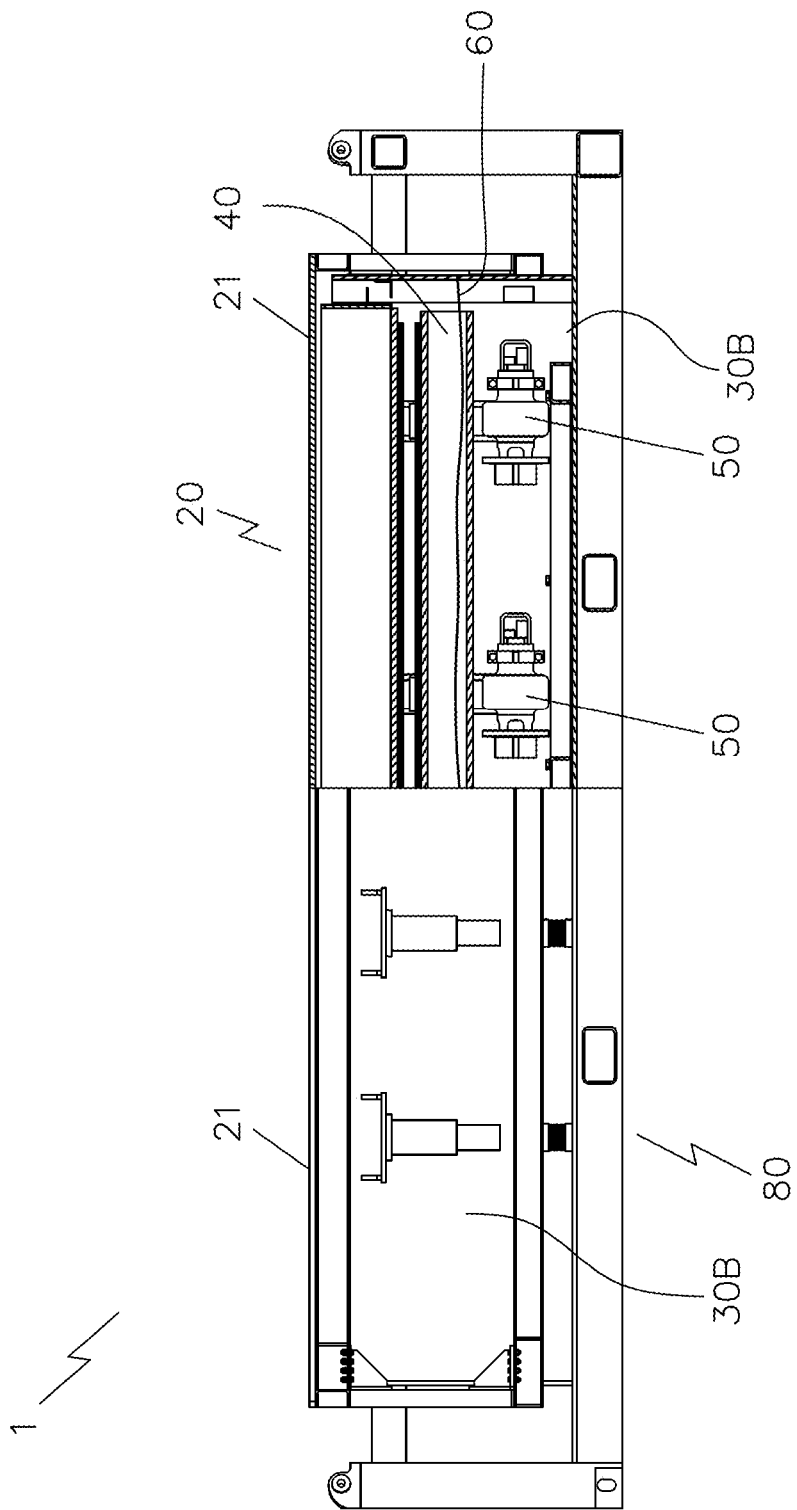
FIG. 7 is a schematic partial cross-section front view of a further configuration of the shock testing apparatus of FIG. 6.

With reference to FIGS. 6 and 7, optionally the shock testing apparatus 1 may comprise an elongate impact table 20 and associated elongate tank 30B that spans the length of the base structure 80. As shown in FIG. 7, which includes a cross-section of a portion of the impact table/tank assembly of FIG. 6 in the plane B-B, multiple airguns 50 are arranged in a linear array underneath the float 40 and impact table 20.

Figure 8:
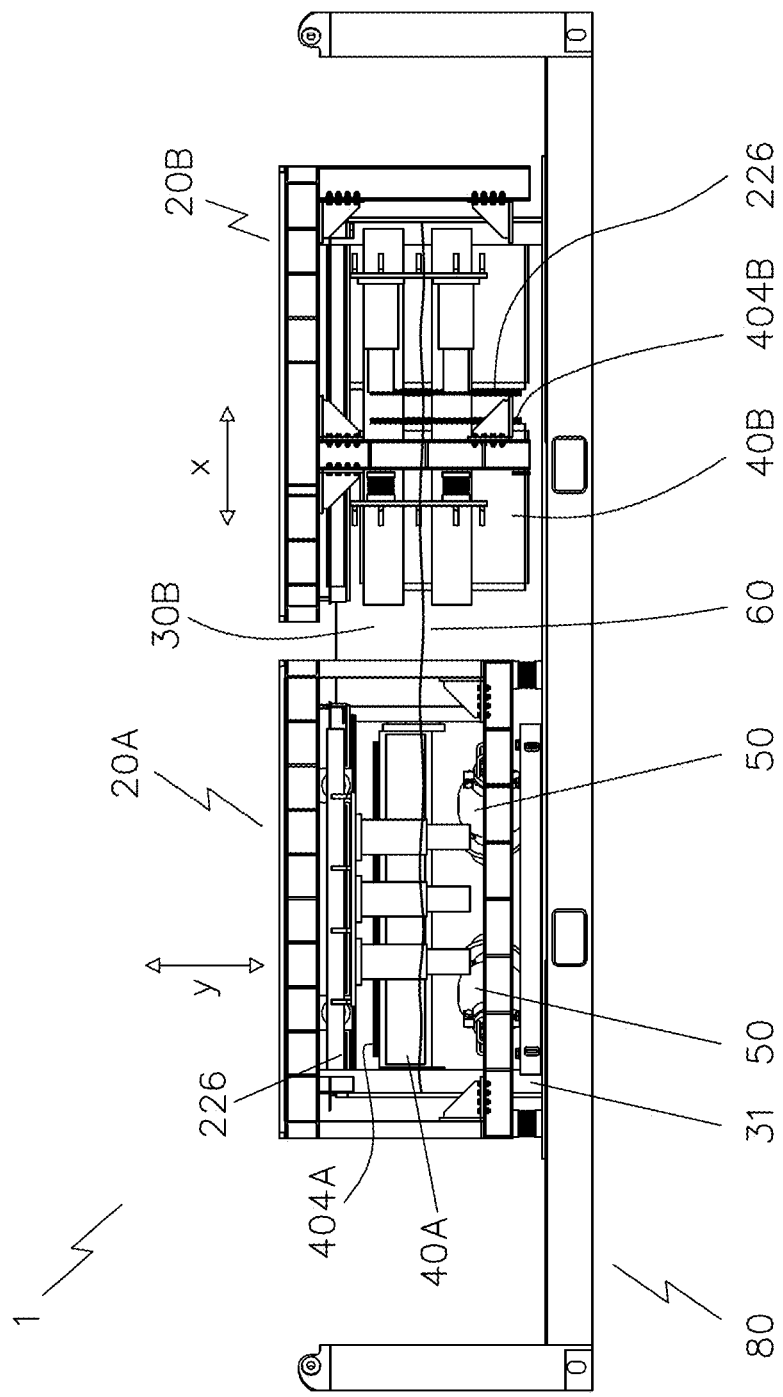
FIG. 8 is a schematic cross-section front view of a further configuration of the shock testing apparatus in accordance with the invention, where testing may be undertaken in both horizontal and/or vertical directions.

With reference to FIG. 8, there is shown a base structure 80 which supports an example of the shock testing apparatus comprising an elongate tank 30B incorporating separate impact tables 20A, 20B for shock testing in both vertical and horizontal directions as denoted by arrows X and Y, respectively. The first impact table 20A is movable in a vertical direction Y and is associated with a vertically constrained float 40A. The second impact table 20B is movable in a horizontal direction X and is associated with a horizontally constrained float 40B. In this example, airguns 50 are located below the first impact table 20A. Upon operation of the airguns the energy of the transient acoustic pulse is transferred through the water 60 directly to the floats 40A, 40B associated with the first and second impact tables 20A, 20B, respectively. The vertically constrained float 40A moves upwardly such that its impactor plate 404A strikes impactor plate 226 of impact table 20A in the manner described previously. The horizontally constrained float 40B moves laterally such that its impactor plate 404B strikes the impactor plate 226 of impact table 20B, imparting a horizontal shock pulse into a test object that is located on impact table 20B. Shock testing of an item in both vertical and horizontal directions simply requires relocating the test item from one impact table to the other and re-firing the airguns 50. Alternatively, testing of different items in vertical and horizontal directions may be carried out simultaneously.

Figure 4B:
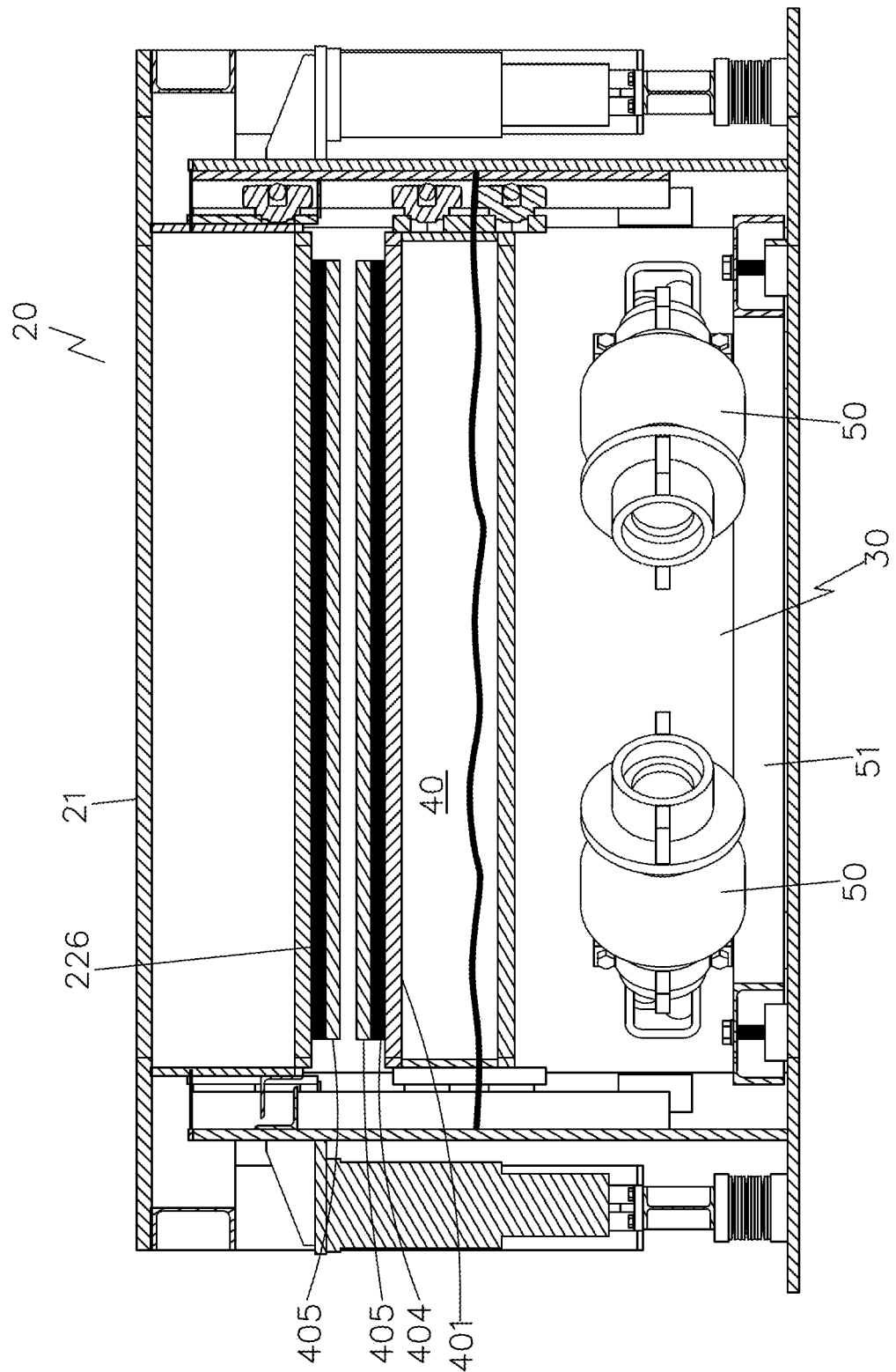

With reference to FIG. 4b, in accordance with the present invention, one or more of the impactor plates 226, 404, 404A, 404B of the float and/or impact tables may be further provided with one or more coverings or pads 405 on their striking surface. The coverings or pads 405 may be formed from a resilient material, for example, but not limited to, elastomeric material. Different coverings/pads 405 may comprise various material grades or thicknesses. In this way, the shock pulse, and more specifically the rise-time, imparted to an impact table 20, 20A, 20B may also, or alternatively, be shaped by altering the damping response through the provision and/or alteration of the coverings/pads at selected impactor plates.

Airgun firing controls may be located within the curtilage of the base structure 80.

As shown by way of example in in FIG. 5, the shock testing apparatus further comprises one or more data capture means located on said apparatus, such as but not limited to: high-speed cameras 12; strain gauges 13; pressure gauges 14 (FIG. 4a); accelerometers 15, or other instrumentation having the purpose of monitoring the test article response and providing feedback to the operator on apparatus performance.

The present invention thus provides a portable shock testing apparatus and method that allows a tuneable shock impulse to be imparted to equipment in a safe, repeatable and cost-effective manner.

The invention claimed is:

1. A shock testing apparatus comprising:
an impact table for supporting an object to be tested;
a tank having a plurality of upstanding sidewalls which extends substantially perpendicularly from a base of the tank;
at least one float;
one or more airguns located in the tank between the plurality of upstanding sidewalls at a location between the base of the tank and at least one float;
wherein the at least one float floats upon a top surface of a fluid held within the tank and moves within the tank to impact the impact table in response to the firing of the one or more airguns.

2. The shock testing apparatus as claimed in claim 1, wherein the one or more airguns are mounted on one or more airgun support frames located proximate to the base of the tank.

3. The shock testing apparatus as claimed in claim 2, wherein the one or more airguns include at least four airguns.

4. The shock testing apparatus as claimed in claim 3, wherein the one or more airguns are arranged in a symmetrical array.

5. The shock testing apparatus as claimed in claim 1, wherein at least two of the one or more airguns are arranged in pairs.

6. The shock testing apparatus as claimed in claim 5, wherein each pair of airguns is located on a dedicated airgun support frame.

7. The shock testing apparatus as claimed in claim 2, wherein the spacing of the one or more airgun support frames from the base of the tank is adjustable by means of variable height spacers.

8. The shock testing apparatus as claimed in claim 1, wherein the one or more airguns are seismic airguns, the firing of which is configured to cause a transient acoustic pulse or wave to propagate into the fluid held within the tank to affect motion of the at least one float in the direction of the impact table thereby imparting a shock pulse to the impact table.

9. The shock testing apparatus as claimed in claim 8, wherein a shape or a magnitude of the shock pulse to the impact table is variable.

10. A method of shock testing an object comprising the steps of:
   providing a shock testing apparatus comprising an impact table for supporting an object to be tested, a tank having a plurality of upstanding sidewalls which extends substantially perpendicularly from a base of the tank, at least one float, and one or more airguns located in the tank between the plurality of upstanding sidewalls at a location between the base of the tank and at least one float, wherein the at least one float floats upon a top surface of a fluid held within the tank and moves within the tank to impact the impact table in response to the firing of the one or more airguns;
   securing an object to be tested on the impact table of the shock testing apparatus; and
   firing the one or more airguns to cause a transient acoustic pulse or wave to propagate into the fluid held within the tank to affect motion of the at least one float in the direction of the impact table such that the float impacts the impact table thereby imparting a shock pulse to the object being tested.

11. The shock testing apparatus as claimed in claim 1, wherein the one or more airguns are seismic airguns, the firing of which is configured to cause a transient acoustic pulse or wave to propagate into the fluid held within the tank to meet a base of the at least one float.

\* \* \* \* \*